United States Patent [19]
Maury

[11] 4,025,839
[45] May 24, 1977

[54] DEVICE FOR AN ACCURATE CONTROL OF FINAL POSITIONING AND FOLLOW-UP OF A DISPLACEABLE MEMBER WITH RESPECT TO A REFERENCE

[75] Inventor: Christian Maury, Velizy, France

[73] Assignee: Compagnie Internationale pour l'Informatique, Louveciennes, France

[22] Filed: Apr. 29, 1975

[21] Appl. No.: 572,757

[30] Foreign Application Priority Data

May 6, 1974 France ............................ 74.15600

[52] U.S. Cl. .............................. 318/632; 318/561; 318/592
[51] Int. Cl.² ....................................... G05D 23/275
[58] Field of Search ........... 318/632, 571, 561, 592

[56] References Cited
UNITED STATES PATENTS 3,917,930  11/1975  Davey et al. ................. 318/632 X Primary Examiner—B. Dobeck
Attorney, Agent, or Firm—Kemon, Palmer & Estabrook

[57] ABSTRACT

A system for positioning a displaceable member with respect to a reference conventionally uses a servomechanism having feedback position sensing and speed sensing loops connected to an input of the control path of the servo. Usually, the system operates in two successive phases:- a coarse positioning phase and a fine positioning phase. In the fine positioning phase, both loops are active. Nevertheless, if the reference tends to fluctuate, the accuracy of the final positioning may be less than acceptable. In a system according to this invention, an additional device is provided which, under a threshold value of the output of the position difference sensor, disconnects the speed difference sensor and inserts in the single remaining loop series correcting networks which, in addition to ensuring improved accuracy of the final positioning, also ensures an accurate follow-up of the fluctuations of the reference.

6 Claims, 9 Drawing Figures

DEVICE FOR AN ACCURATE CONTROL OF FINAL POSITIONING AND FOLLOW-UP OF A DISPLACEABLE MEMBER WITH RESPECT TO A REFERENCE

BRIEF SUMMARY OF THE PRIOR ART (background of the invention)

A system for positioning a displaceable member with respect to a reference carried by a fixed member conventionally comprises a servo-mechanism which operates from signals outputting from a position sensor and a speed sensor. The speed sensor determines the difference between the actual speed of the displaceable member and an adjustable reference speed value. The position sensor determines the difference between the actual position of the displaceable member and the position of a selected one of a series of marks carried on the fixed member, said selected mark being said to be the "reference". The position sensor consequently comprises a mark reader head. More often the marks are uniformly spaced on their carrier. The conventional operation of such a system is as follows:

Once a mark is selected and its number set in the position sensor, a command starts the system for driving the servo in accordance with a predetermined and constant speed law. The displaceable member is so driven as to pass over all the marks but the one preceeding the selected reference which is reached at a substantially zero speed. This is usually termed the coarse or rough positioning phase or step of the operation. When the speed falls under a very small threshold value, the system is switched to a second phase which is usually termed a "fine" positioning phase or step. The difference position sensor is switched on and the operation of the servo-mechanism is consequently placed under the control of both the speed difference sensor and the position difference sensor. According to the law which controls the speed of the movement in the first phase, the displaceable member, hence the reader head affixed to its carriage starts from less than one step between the next to the last and the final mark (the one which has been selected as the final reference).

MOTIVATION OF THE INVENTION:

Such a conventional system may however be considered as insufficiently accurate in those cases where the reference is not definitely fixed but is liable to fluctuate in quite small vibrations or oscillations of random character, though being of a general orientation in registration with the direction of displacement of the displaceable member proper.

Such is the case for instance the case in an equipment for positioning magnetic head blocks radially with respect to a plurality of magnetic disks which are stacked and driven by a common driver. In such equipment, one face of a disk is reserved for recording marks, each one as a specially magnetized track readable by an also specialized read-out head. As no mechanical drive for such a stack is known which can rotate them with a perfect stabilization of the rotation, the cross-over points between the tracks and the read-out head will necessarily fluctuate. The displacement of the heads with respect to the disks is provided in the radial direction. Further, recording of the reference track face of a disk can only be made during rotation and, since the driving member for such a recording is not the same as the one in the final equipment, this increases the defect. Further, mechanical inaccuracies in the radial drive of the heads will entail variations in the movement of the sensor head with respect to the tracks. This too will increase the chances of inaccuracies in the final positioning of the displaceable member constituted by the set of magnetic head blocks in the equipment.

It is an object of the invention so to improve such a conventional positioning system that the above defined drawbacks are eliminated and, after an accurate positioning is obtained, the displaceable member permanently follows any fluctuation of position of the reference track.

Shortly summarized the invention provides an additional device which, during the fine positioning phase, detects the passage of the position sensor head at a small and predefined distance from the reference mark and controls, first a switch off of the speed sensor from the servo-mechanism input and, second part, switch in of certan correction networks in the path connecting the position sensor to the input of the servo-mechanism.

SHORT DESCRIPTION OF THE DRAWINGS

The invention will be described in full detail with reference to the accompanying drawings, wherein:

FIG. 1 shows the block diagram of a conventional positioning system in the fine positioning state thereof, FIG. 2 is a block diagram of the condition of the positioning system provided with a device accordng to the invention after said device has switched into the additional phase it ensures from the fine positioning state, FIG. 3 shows the variation with respect to the time of a commande of the speed of displacement in the coarse phase of a system according to the concerned kind, and of the corresponding variation of said speed, FIG. 4 defines the variation of the signal outputting the position sensor at the last half-step ahead of the reference mark in a system embodying the invention, FIG. 5 shows the characteristic curve plotted against frequency, of a correction network provided in a system according to the invention, FIG. 6 shows a complete block diagram of a conventional positioning system, FIG. 7 shows signal and voltage variations developped in the system of FIG. 6 in its final positioning state, FIG. 8 shows a complete block diagram of a positioning system embodying the invention, and, FIG. 9 shows signal and voltage variations developped in the system of FIG. 8 in the final last state of accurate positioning and follow-up condition thereof.

DETAILED DESCRIPTION

Any system of the concerned kind incorporates an actuator ACT fed by a power amplifier AP and driving a reference mark reader $s$ the output signal of which represents the difference between the actual position $y$ of the reader and the marked position $x$ of the reference. This signal is amplified and casually corrected in Kx, the output of which delivers the error positioning signal ep. $s + Kx$ together constitute the position difference sensor CP. Means forming a signal measuring the speed $v$ of the movement of the actuator ACT, a tachometer for instance, is associated with ACT and this signal $v$ is calibrated in a circuit Kv. These means and this circuit together constitute the speed difference sensor CV. With the said actuator ACT are futher included means for obtaining a signal measuring the acceleration γ which is calibrated in a circuit Kγ. This signal may for instance be the current passing through the actuator.

Figure 6:
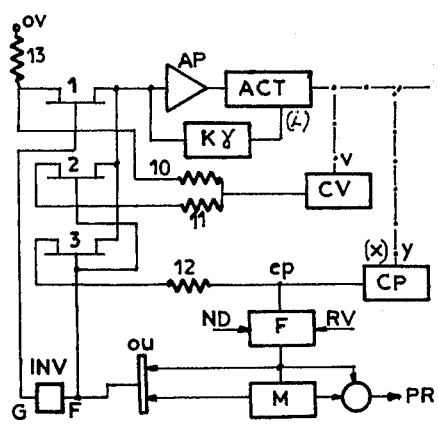

In the final "fine positioning" phase of a conventional system, the three defined signals are applied to a summing circuit accessing the actuator ACT, through the power amplifier AP which actually is an operational amplifier. Referring to FIG. 6, the input of AP is directly connected to the output of Kγ and paralleled on the outputs of three electronic switches 1, 2 and 3, each having a control input and an information input. The information input of the switch 1 is connected to a terminal receiving the speed command OV, through a resistor 13 and further, through a resistor 10, the output signal from CV. The information input of the switch 2 is connected through a resistor 11 to the output of CV. The information input of the switch 3 receives through a resistor 12 the output signal from CP.

Figure 3:
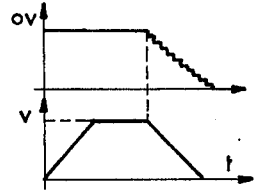
Figure 7:
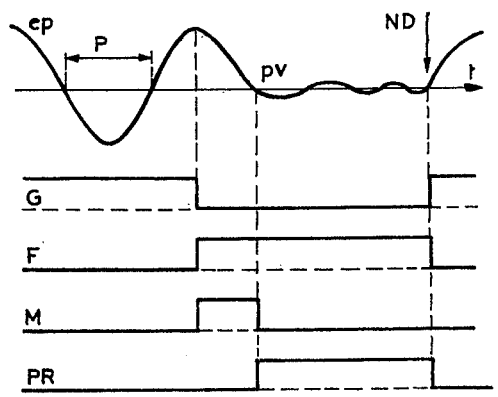

In this system, a speed command OV is applied to the switch 1 which is closed whereas the switches 2 and 3 are open. The command voltage has the waveform shown in the upper part of FIG. 3. Under such conditions, the system is connected in a purely speed control mode. The speed $v$ follows the command, as shown for instance in the lower graph of FIG. 3. Conventionally, the command OV does not present a linear relation with respect to difference of the positions of the position reader of the position difference sensor and of the position of the reference, at which the positioning must stop. It is also usual that the movement is followed from progressively decreasing by one unit at each passage of a mark the content of a preset counter. At each such passage, the signal from CP comes temporarily to zero, as shown in FIG. 7 for the next to last step. The thus formed signal RV is applied to a two logical condition circuit F and this circuit can change its condition when the signal ep passes through a predetermined threshold value. It was this circuit $f$ which maintained the switch 1 closed and the two other switches 2 and 3 open. The actuation of F reverses these conditions so that, in the now fine positioning stage, the system is connected as shown in the block diagram of FIG. 1. An inverter circuit INV distinguishes switch 1 from switches 2 and 3 with respect to the output of F. The position difference decreases towards zero and reaches a small predetermined value within a time interval tp, FIG. 4. In this figure, as in FIG. 7, the value of the threshold of actuation of F is shown equal to P/2, i.e. one-half of the distance between the last passed mark and the reference mark at which the positioning operation must stop. The device is accrued by the provision of a one-shot M which is activated from the output of F and ensures a delay for the production of a signal PR indicating the end of the positioning operation and locking the complete system. The PR signal may be derived from the output of F which is a bistable element per se and must consequently wait for a new start signal ND which resets it and consequently anew reverses the conditions of the switches 1 and 2, 3 to the coarse positioning step of a further positioning. The conditions of the connections G, PR and of the members F and M are shown in FIG. 7 as they vary in the final positioning step of the conventional system.

With such an organization, the last step is totally controlled in feedback relation which, as known, is a condition which per se limits the performance of a servo-arrangement. The regulation control of the system is further of the known type which may be a "P.D.D.²" control, i.e. it comprises a component, outputting CP, which is proportional to the displacement, a componenet, outputting CV, which is proportional to the speed (first derivative of the displacement) and a component, outputting $K_o$, which is proportional to the acceleration, (second derivative of the displacement). The overall transfer function of such a regulation control may be expressed by the relation:

$$F_{(p)} = \frac{a_0}{a_0 + a_1 p + a_2 p^2 + \ldots} \quad (i)$$

which, as known, ensures a zero error responsive to a step of the displcement but a permanent error responsive to a command comprising a ramp of displacement and an error which is proportional to the elapsed time responsive to a ramp or step of acceleration.

Figure 4:
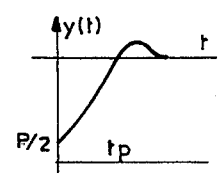

For obtaining a quicker and well damped response for the passage through the last half-step of the positioning operation, so that the time interval tp, FIG. 4, will be the actual time for which the difference $y(t)$ falls to zero and is damped within a single outpassing of small value, it would be necessary to substantially increase the gain of Kx of the position difference or "error" voltage issuing from $s$. However, in a feedback loop comprising a speed component, no increase of gain may be obtained at a sufficient rate because the frequency passband of a speed sensor is always limited and the intrinsic mechanical resonance frequencies must be rejected. This is the ture reason why a conventional system cannot fit the particular conditions which have been herein above defined when the reference "mark" is a fluctuating one.

Figure 2:
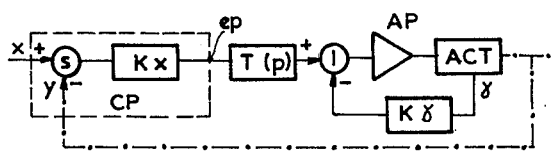

The device which is provided by the invention for improving the system in such a respect provides, FIG. 2, that the regulation control is serially connected, as shown at T(p), between the output of the position sensor CP and the input of the power amplifier AP (through an OR-gate for application to the input of the said amplifier of the acceleration representing feedback voltage from Kγ. The serial connection directly gives the benefit of high performance capabilities in such a loop wherein the speed sensor CV is eliminated, hence are eliminated all and any limitations which were dependent or its action in the final positioning step.

Figure 1:
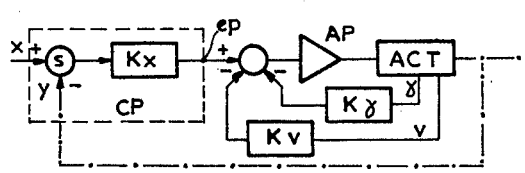

The regulation control circuit T(p) must introduce two distinct regulation factors:

The first brings an integral action command, the localization of which enables an important increase of the loop gain, in a ratio at least equal to 10 with respect to the loop gain in the structure acording to FIG. 1.

The second carries an approximation of a correction of the P.D. kind, with a limitation of the frequency range because noises must be rejected. Such a frequency limitation is far less important than the limitations which were introduced by the speed sensor CV in a structure according to FIG. 1.

Figure 5:
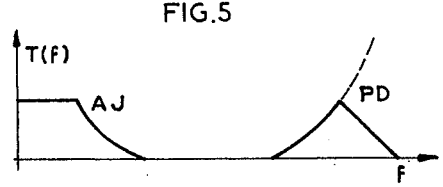

The curve shown in FIG. 5 reveals the action of these two correction factors, and especially with respect to the frequency response T(f) of the circuit T(p) which is plotted against the frequency $f$ in FIG. 5.

The gain across T(p) is of a constant value at very low frequencies, due to the integral action command AJ. Then the circuit presents a gain equal to 1 (O dB) up to a frequency zone wherein the P.D. type correction is activated and the span of which is limited as said for rejecting transients and noises.

The structure of FIG. 2 presents an overall transfer function expressed as:

$$F_1(p) = \frac{a_o + a_1 p}{a_o + a_1 p + a_2 p^2 + \ldots}. \quad (2)$$

Not is only the error responsive to a displacement step zero but the error responsive to a ramp shaped command of displacement is also zero and the error responsive toan acceleration step is of constant value. Since the error for a ramp shaped displacement is zero, the response of the servo-mechanism is quite accurate for ensuring the follow-up of the reference fluctuations by the read-out head in the above described example, and more generally by any reference mark reader in any other applications. Once the final positioning has been accurately ensured, the "input command signal" $x$ only represents the sum of the mechanical deficiencies at the "servo" face of the reference carrier so that the sensor CP permanently issues a signal representing the error $ep$ between $x$ and the actual position $y(t)$ read on said face.

However, in order that the two corrections can operate in a satisfactory way, the introduction of T($p$) must be made during a fine positioning step, which is acting as a prepositioning step for the new final step according to the invention. The explanation is that the integral action correction requires that the average value of the signals applied to T($p$) be substantially zero and that the P.D. type correction requires the phase rotation of T($p$) to be as low as possible.

Figure 8:
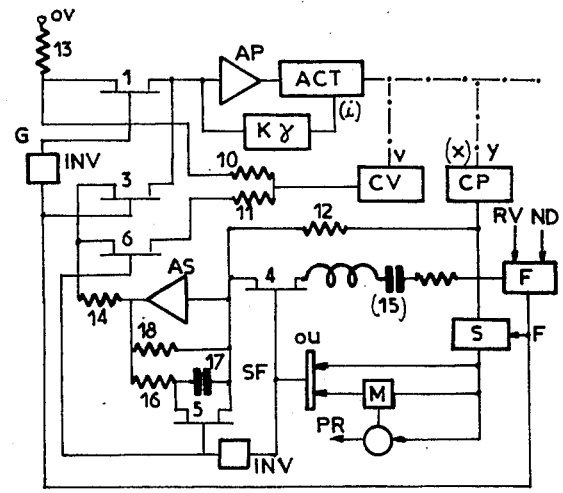

The structure of a system embodying the invention is shown in FIG. 8, in which, the main elements of FIG. 6 are reproduced. The speed command signal OV through a resistor 13 reaches the information input of the switch 1, which is also connected through a resistor 10 to the output of the speed sensor CV. The output of 1 is connected to the input of the power amplifier AP in algebraic sum with the output of the acceleration sensor $K_n$ and the output of a second electronic switch 3. The bistable member F is connected to the output of the position sensor CP and the resistor branch 12 directed towards the input of the switch 3 through, in FIG. 8, it passes through a summing amplifier AS wherein 12 is one of the branches of an input summing network. When the position component reaches 3, it is added, when a further electronic switch 6 is conducting, to a component signal derived by the resistor 11 from the output of the speed sensor CV. The signal outputting AS is carried through a series resistor 14 to the input of 5. The summing amplifier is provided with a feedback network comprising two brances:- a series resistor 18 and a parallel branch comprising a series resistor 16 and a condenser 17 which is shunted by an electronic switch 5. The branch 12 of the input network of the summing amplifier is shunted by a resonant circuit (15) in series with an electronic switch 4.

The output of CP is further connected to an activation input of a further two-condition bistable circuit S which is authorized to operate only when the circuit F has been already activated. The circuit S is responsive when, during the final half-step of positioning control, the level of the output of CP falls to a threshold value, obviously lower than the value to which the circuit F operated. When, for instance, F operates when the distance to the reference mark reaches P/2, the circuit S is adjusted to operate when the said distance reaches P/10 for instance.

The output from F is connected to the control input of the switch 3 and, through an inverter INV, to the control input of the switch 1. In the rest, or de-activated condition of F, the switch 1 conducts and the switch 3 is blocked. In the actuated condition of F, the switch 1 is blocked and the switch 3 is conducting.

The output of S is, through an OR circuit OU applied at SF which is connected to the input controlling the condition of the switch 4 and, through an inverter InV to the control inputs of the switches 5 and 6. When S is at rest, the switch 4 is blocked and both switches 5 and 6 are conducting. When S is actuated, the switch 4 is conducting and the switches 5 and 7 are blocked. A one-shot M is further connected across the output of S and an input of the Or-circuit OU. The provision of the one-shot M protects the control arrangement of the switches 5 and 7 against a possible spurious resetting of S if, from an overstepping of the actuator with respect to the reference mark, the output of CP temporarily exceeded the threshold of S prior to returning to the correct positioning which will bring back the output of CP to a value lower than the threshold of S. The one-shot M further controls the gate PR as it does in the conventional prior system.

Figure 9:
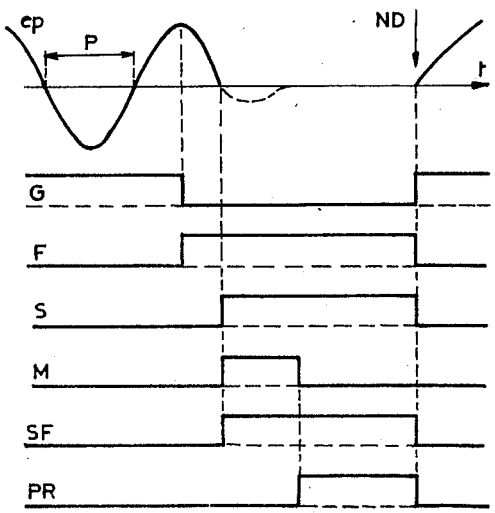

The operation of the system shown in FIG. 8 may be explained as follows, the graphs of FIG. 9 explaining it in most parts in the same fashion as the graphs of FIG. 7 illustrate the operation of FIG. 6.

A start command ND places the circuit F in the condition for which 1 is conducting and 3 is blocked. As S is controlled from F to be only capable of being and remaining actuated when F itself is actuated, the resetting of F produces the resetting of S. The switch 4 is blocked and the switches 5 and 6 are conducting. After the first phase of coarse positioning, the interval $ep$ reaches such a low value that F is actuated:- switch 1 is blocked and switch 3 is conducting. The fine positioning step goes on, the position and speed signals being both applied to the power amplifier input. When the distance between the actual position of the displaceable member is lower than, say, P/10, S operates, blocking 6 and 5 and unblocking 4. The speed component is eliminated from the input of the power amplifier. Concomitantly, the resonant circuit (15) is connected and so is the condenser 5. The summing amplifier operates as an integrator amplifier, hence the action of the integral action correction. The resonant circuit operates as a P.D. corrector circuit with the above-defined frequency rejection. In such a condition, the system operates as a follower of the reference mark now reads by the reading head of the position sensor, while maintaining $ep$ to zero as long as F is actuated, i.e. up to the next start command ND.

By way of illustration, the system according to the invention, used for controlling the positioning of magnetic head blocks in magnetic disk equipment wherein the spacing pitch between the tracks is about 66$\mu$m, the static error has been brought from ±2$\mu$m (FIG. 6) to ±0.2$\mu$m (FIG. 8). The follow-up error, measured at 60 Hertz, speed of rotation of the disk equal to 3,600 rpm., has been descreased from 37% to 7% of the module of the signal $x(t)$ as herein above defined. The overall gain on the maximum error in the follow-up is higher than 2.

What is claimed is:

1. In a system for positioning a displaceable member with respect to a constantly fluctuating reference, comprising position and speed difference sensors having outputs connected to an input of a servo-mechanism controlling the displacement of said member during sequentially operated coarse and fine positioning phases thereof, a device ensuring accurate final positioning and reference follow-up member which comprises combination of means responsive to a position difference threshold value in the signal outputting the position difference sensor, servo integral action correction means, servo frequency-limited amplitude and speed displacement correction means and switching means responsive to the activation of the said position difference threshold value responsive means for switching off the speed difference sensor from said servo-mechanism input and for switching in both said correction means between the output of the position difference sensor and the said input of the servo-mechanism.

2. Device according to claim 1, wherein said position difference threshold value responsive means comprises a two-condition bistable member having an input to the output of the said position difference sensor and having first, second and third outputs and said switching means comprises a first electronic switch controlled from the said first output, serially connected between the output of the said speed difference sensor and the said servo-mechanism input and second and third electronic switches respectively controlled by the second and third outputs of the bistable member and respectively controlling the connections of the said correction means in the series path from the output of the said position difference sensor and the said input of the servo-mechanism.

3. Device according to claim 2, wherein said series path comprises a summing amplifier having a two-branch input summing network and having a two-branch feedback network, wherein said amplitude and speed displacement correction means comprises a resonant network as one of the branch of the said input summing network in series with said second electronic switch and wherein said integral action correction means comprises a condenser in one of the branch of the said feedback network and is shunt connected with the said thir d electronic switch.

4. Device according to claim 2, wherein a one-shot member is connected between an output of the said bistable member and the control inputs of the said electronic switches in parallel with the connections from said bistable member to the said control inputs.

5. Device according to claim 2, in a system comprising a bistable member memorizing the transition from the coarse positioning phase to the fine positioning phase, said position difference threshold value responsive means comprises and authorization input connected to an output of the said bistable member marking the activation thereof.

6. Device according to claim 1, wherein the position difference sensor comprises a reference reading head.

* * * * *